March 17, 1925. Re. 16,026

A. J. WYCHERLEY

LOCK

Original Filed Aug. 30, 1920

INVENTOR
Arthur Jefferson Wycherley
BY Thomas A. Wille
ATTORNEY

Reissued Mar. 17, 1925. Re. 16,026

UNITED STATES PATENT OFFICE.

ARTHUR JEFFERSON WYCHERLEY, OF WELLINGTON, NEW ZEALAND.

LOCK.

Original No. 1,389,805, dated September 6, 1921, Serial No. 407,049, filed August 30, 1920. Application for reissue filed May 5, 1923. Serial No. 636,983.

*To all whom it may concern:*

Be it known that I, ARTHUR JEFFERSON WYCHERLEY, a subject of the King of Great Britain, residing at Wellington, New Zealand, have invented a new and useful Lock, of which the following is a specification.

This invention relates to locks of the well known pin-tumbler type (including latches in the term locks), and its object is to provide an improved device to render such locks more efficient, safe and difficult to tamper with, this object being achieved without altering the appearance of the lock. To this end there is provided means for preventing any turning by a tool devised for the purpose, of the part known as the cylinder, the face of which is on an outside surface of the door on which the lock is placed, and also for preventing the removal of the cylinder ring, or the drilling of a hole for the passage of a special tool to grip and turn or disconnect the connecting bar of the lock.

With this object there is substituted for the usual loose cylinder ring a metal bush which may be integral or in two parts, and which consists of a front flange or ring portion and a body portion which is non-cylindrical and preferably rectangular in cross section, the latter portion, which is adapted to surround the lock cylinder and connecting bar, being inserted in a correspondingly shaped mortise or recess in the door. This device is formed with an axially arranged hole corresponding in shape with and adapted to fit closely around the irregularly shaped portion of the lock which is known as the cylinder. This hole, for the great majority of the locks to which the invention is applicable, has for shape or contour a curve at each side, a similar curve below and a slot at the top diametrically opposite the last mentioned curve.

The invention is illustrated as applied in one way in the accompanying drawings, in which:—

Figure 1:
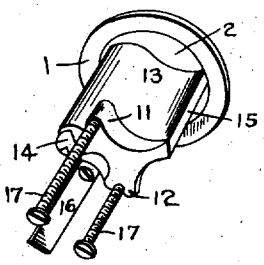
Figure 1 is a perspective view of the cylinder and connected parts of a lock of the type described as hitherto used which secures the body of the lock to a door through a hole in the door.
Figure 2:
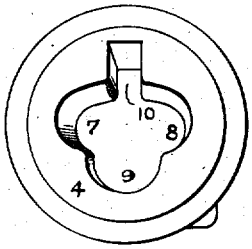
Fig. 2 is a perspective front view of my improved lock cylinder fixing device used for the purpose of preventing the lock cylinder from being turned in an attempt to unlawfully operate the lock.
Figure 3:
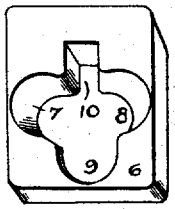
Fig. 3 is a perspective rear view of the device shown in Fig. 2.
Figure 4:
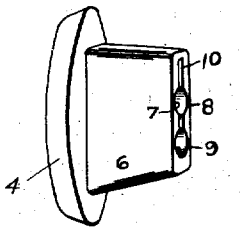
Fig. 4 is a perspective side view of the same device showing the inner end of the opening therein.
Figure 5:
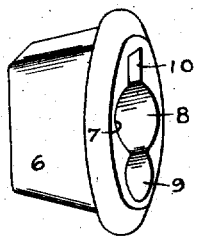
Fig. 5 is a perspective side view of the same device showing the outer end of the opening therein.
Figure 6:
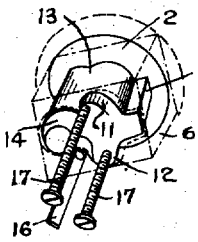
Fig. 6 is a perspective view of the part of the lock shown in Fig. 1, but with the addition thereto of the device in situ shown by dotted lines.
Figure 7:
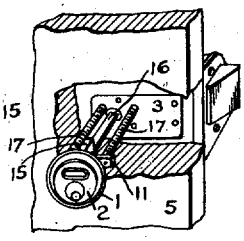
Fig. 7 is a perspective view of a lock as usually secured to a door.

According to this invention, the ring 1 heretofore used is removed from the disk 2 of the lock 3 and for it is substituted the device shown in Figs. 2, 3, 4 and 5, as seen in dotted lines in Fig. 6. The front face of this device is formed to present the same appearance on the outside of the door 5 as the ring 1, and has a flange 4, which is here shown as circular and which bears against the face of the door. The rear portion 6 of the device is non-cylindrical and preferably an oblong or cubical block or the like similarly adapted to be inserted in a correspondingly shaped mortise or recess made in the door 5 so that it cannot be turned around. Such rear portion may be of any suitable length according to the thickness of the door and the dimensions of the lock. The device is provided with an opening having curves 7 and 8, one at each side, a curve 9 below and a slot 10 diametrically opposite said curve 9. These curves 7, 8 and 9 embrace the lugs 11, 12 on the cylinder 13, and a portion of the tightening screws 17, and also the lower portion 14 of the cylinder 13 respectively, and the slot 10 embraces the feather 15 on the top of the cylinder 13. By reason of this device and arrangement the cylinder and the device are in co-operation and cannot be turned around. It will be seen that the device shown in Figs. 2, 3, 4 and 5 has its rear portion 6 of some length usually coinciding with the thickness of the door and is preferably made wholly or in part of hardened steel, and as it completely incloses the cylinder and connecting bar it is impossible for a hole to be bored for the passage of a tool to grip and turn the connecting bar 16.

What I claim is:—

1. A lock cylinder fixing device, comprising a substantially rectangular body to fit in a corresponding mortise in a door, and a front flange to bear against the face of the door, said body having an opening extending therethrough and corresponding with the cross-section of the lock cylinder.

2. A lock cylinder fixing device, comprising a metal bush having a flange ring front portion to bear on the face of a door and a rectangular body portion for arrangement in a correspondingly shaped mortise in the door and provided with an opening having a curve at each side, a curve below and a slot at the top diametrically opposite said last mentioned curve.

3. A lock cylinder fixing device comprising a body having a bushing portion to fit in a mortise in a door and to inclose the cylinder and connecting bar of a lock, and also having a front flange to bear against the face of the door, the body being of such form as to prevent it from being turned in the mortise, and being provided with an opening corresponding with the cross-section of the lock cylinder.

4. A lock cylinder fixing device comprising a body having a bushing portion to fit in a mortise in a door and to inclose the cylinder and connecting bar of a lock and also having a front flange to bear against the face of the door, said body being further provided with means to prevent said body from being turned in the mortise, and being provided with an opening corresponding with the cross-section of the lock cylinder.

5. A lock cylinder fixing device, comprising a substantially rectangular body within the mortise in a door, and a front flange to bear against the face of the door, said body having an opening extending therethrough to receive and hold the lock cylinder from being turned therein.

6. A lock cylinder fixing device, comprising a substantially rectangular body within the mortise in a door, said body having an opening extending therethrough to receive and hold the lock cylinder from being turned therein.

In witness whereof I affix my signature.

ARTHUR JEFFERSON WYCHERLEY.